United States Patent [19]

Lödige et al.

[11] 4,026,686

[45] May 31, 1977

[54] VACUUM FILTER FOR THE PURIFICATION OF GASEOUS MATERIALS

[76] Inventors: Wilhelm Lödige, Elsenerstrasse 9c;
Fritz Lödige, Leuschnerstrasse 12;
Josef Lücke, Im Lohfeld 15, all of,
D-479 Paderborn, Germany

[22] Filed: Apr. 25, 1975

[21] Appl. No.: 571,698

[30] Foreign Application Priority Data

May 11, 1974 Germany .......................... 2422906

[52] U.S. Cl. .............................. 55/269; 55/341 R;
55/341 NT; 55/484; 432/225
[51] Int. Cl.² ........................................ B01D 53/00
[58] Field of Search ............................. 55/267–269,
55/341, 484, 20; 165/154, 157; 432/5, 224, 225

[56] References Cited

UNITED STATES PATENTS

| | | | |
|---|---|---|---|
| 984,047 | 2/1911 | Touzalin | 55/269 X |
| 2,009,352 | 7/1935 | Adams | 55/318 X |
| 2,804,168 | 8/1957 | Church | 55/267 X |
| 2,982,532 | 5/1961 | Hakes | 55/268 X |
| 3,158,455 | 11/1964 | Lincoln | 55/341 X |
| 3,244,152 | 4/1966 | Mixon et al. | 55/269 X |
| 3,307,335 | 3/1967 | Shomaker | 55/267 |
| 3,495,463 | 2/1970 | Howell | 55/267 X |
| 3,606,736 | 9/1971 | Leliaert et al. | 55/341 X |
| 3,704,573 | 12/1972 | Koller et al. | 55/268 |
| 3,765,152 | 10/1973 | Pausch | 55/341 X |

Primary Examiner—Frank W. Lutter
Assistant Examiner—Kathleen J. Prunner
Attorney, Agent, or Firm—Donald D. Jeffery

[57] ABSTRACT

A vacuum filter for separating solid particles from gaseous materials which contain or consist of condensible substances comprising at least one filter tube, through the walls of which the gaseous material flows, means for heating, substantially uniformly, the entire filter surface of the filter tubes by radiant heat, whereby the temperature of the gaseous material can be sustained above the dew point of the condensible substances in the region of the filter.

3 Claims, 2 Drawing Figures

VACUUM FILTER FOR THE PURIFICATION OF GASEOUS MATERIALS

BACKGROUND OF THE INVENTION

1. Field of the Invention

This invention relates to vacuum filters for separating solid particles from gaseous materials which contain or consist of condensable substances, and in particular to a vacuum filter for separating dust from vapours, which filter contains at least one filter tube in a housing, the gaseous material which is to be filtered flowing through the wall of the filter tube so that the solid substances which are required to be separated are retained by the wall of the tube.

2. Description of the Prior Art

One of the problems in filters of this kind and in particular in vacuum filters connected to containers which are at a reduced pressure is that the temperature of the gaseous material which is required to be filtered must not drop below the dew point of the vapour during the filtration process because otherwise the vapour would at least partly condense on the filter. Some vapour is thereby lost and the filtering action is impaired.

In known vacuum filters, it is attempted to overcome this problem by passing the vapour at a sufficiently high temperature through the filter so that it will not cool below its dew point. This, however, requires the vapour to be raised to high temperatures, which in turn entails a high consumption of energy and in any case such high temperatures are not always possible in practice. The problem is not adequately solved by thermally insulating the filter to prevent external heat loss by radiation.

SUMMARY OF THE INVENTION

It is an object of the present invention to provide simple means which will effectively prevent the temperature of gases or vapours which contain condensable substances, from dropping below their dew point in the course of their filtration in vacuum filters used to remove solid particles and in particular finely pulverulent or dust particles from the gases or vapour.

To solve this problem in a filter of the type described above, it is proposed that the filter tubes should be adapted to be heated substantially uniformly over their entire filter surface by radiant heat. Radiant heat is thus directed from outside and/or from inside to those parts of the vacuum filter which are particularly critical for the formation of condensate, namely to the walls of the filter tubes, and the filter tubes are so arranged that none of them are shaded from the radiant heat so that the walls of the filter tubes will be sufficiently heated at all points and at no point can the gases or vapours treated by the filter cool below their dew point. This measure is much more effective and more economical to carry out than that of heating the gaseous material to a sufficiently high temperature before the filtration process so that no cooling below the dew point can take place in the region of the filter. This directed heating according to the invention of the vacuum filter in those areas where the risk of condensate formation is particularly high effectively prevents the formation of condensate since the radiant heat directed to the filter tubes can be regulated according to the given requirements.

In situations where the gaseous material which is required to be purified flows through the inside of filter tubes which are arranged concentrically in the housing, it is particularly desirable and simple to heat the filter tubes with radiant heat from outside. In that case, the wall of the housing of the filter may be provided with heating means, for example the housing may be a double wall through which a heating medium such as steam or hot water can flow. If the wall of the housing is sufficiently insulated from the outside, the heat transmitted to the wall of the housing from the heating medium radiates into the interior of the filter housing and thereby heats the filter tubes as desired.

The filter tubes are suitably arranged at such a distance from each other that radiant heat impinges on all the filter tubes from all sides, that is to say none of the tubes obstructs the flow of heat to any of the other tubes. If the filter tubes are arranged in a closed circle, they are preferably situated sufficiently far apart so that the radiant heat will not only reach the outerlying sections of the surfaces of the filter tubes but will also impinge directly on the inner areas and particularly the areas between adjacent filter tubes. The filter tubes may be closer together if they are arranged in a row or on an open arc of a circle. To ensure that the areas of filter tubes facing the wall of the heated housing will be exposed sufficiently uniformly to the heat rays, the filter tubes must not be arranged too close to the wall of the housing. It has been found that a distance equal to or somewhat greater than about half the diameter of the filter tube is suitable to ensure uniform heating of the filter tubes.

If the filter tubes are distributed in a closed circle, a radiant heater such as a tube or bar may be placed at the centre of this arrangement parallel to the filter tubes so that those parts of the walls of the filter tubes situated on the inside of the circle will be directly exposed to radiant heat. In that case, the filter tubes may, of course, be placed closer together than if radiant heat is applied only from the outside of the circle.

If the gaseous material which is required to be purified flows through the filter tubes from the outside inwards, then according to another embodiment of the invention a radiant heater such as a heating tube or bar is arranged inside each filter tube. In that case, the radiant heat impinges on the wall of each filter tube from the inside.

According to the invention, therefore, the radiant heat always impinges on that side of the wall of the filter tube from which the purified fluid material leaves the tube so that the transfer of heat to the filter tubes is not obstructed by deposits which have been filtered from the material.

BRIEF DESCRIPTION OF THE DRAWINGS

An example of a vacuum filter according to the invention is illustrated diagrammatically in the drawings in which.

DESCRIPTION OF THE PREFERRED EMBODIMENT

Figure 1:
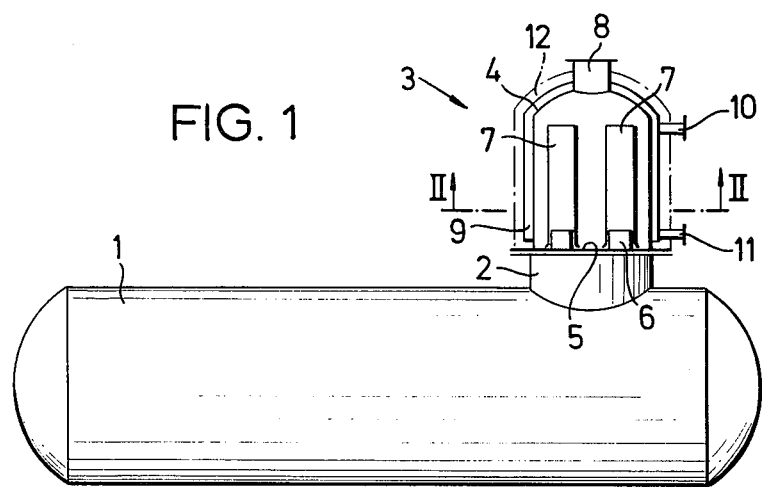
FIG. 1 is a side view of a cylindrical container with a vacuum filter according to the invention attached to it and FIG. 2 is a cross-section through the line II — II of the vacuum filter shown in FIG. 1.

Referring firstly to FIG. 1, a vacuum filter 3 is attached to a connection 2 on a cylindrical container 1. The filter 3 is used to separate fine and very fine solid particles from the vapours leaving the container 1. The container 1 may, for example, be a container for sterilizing loose material.

The vacuum filter 3 has a dome-shaped housing 4 with bottom plate 5 on which a plurality of filter tubes 7 are placed upright on short supporting sleeves 6. The vapour leaving the container 1 flows through the sleeves 6 into the individual filter tubes 7, the walls of which are permeable to the vapour so that the vapour flows through the walls to the outside. After having been purified by the filter tubes 7, the vapour leaves the housing 4 through an outlet 8.

In the region of the filter tubes 7, the housing 4 has a double jacket 9 through which a heating medium may flow. This heating medium may, for example, be introduced through a side connection 10 and be discharged through a side connection 11. Since the housing 4 is placed inside a covering 12 of insulating material, the heating medium transfers its heat substantially only into the interior of the housing 4 so that radiant heat impinges on the filter tubes 7 from all sides. The filter tubes 7 are arranged at such distances apart on the arc of a circle that the heat radiating from outside the arc will also reach the centre of the arc and thus heat the inner sections of the wall of the filter tubes 7.

Figure 2:
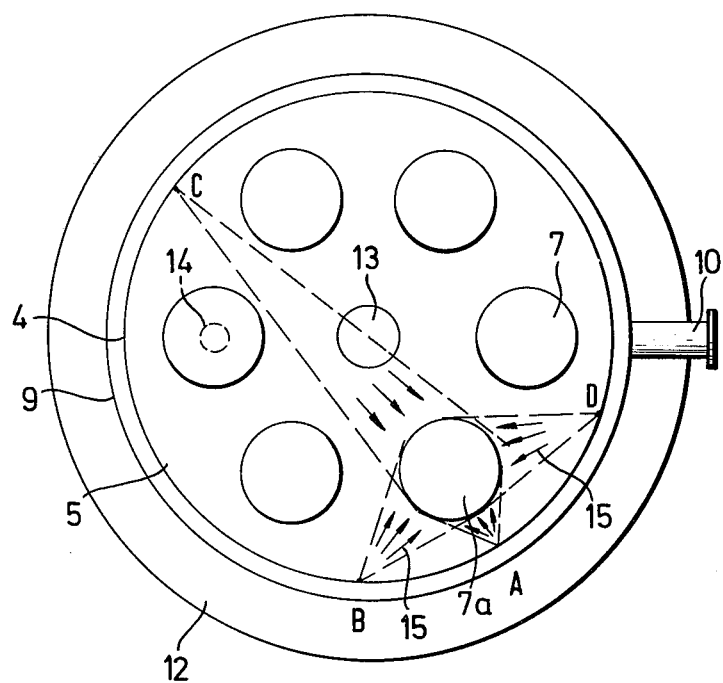

FIG. 2 shows a filter tube 7a to illustrate how radiant heat reaches the filter tubes from all sides so that the surfaces of the tubes are uniformly heated to the desired temperature over their entire circumference. To illustrate this, four points A, B, C and D are taken as sources of radiant heat but it should be remembered that the wall of the housing 4 is a continuous single source of radiant heat and the points A to D have been selected purely for demonstration purposes.

FIG. 2 shows how heat rays indicated by arrows 15 reach the surface of the filter tube 7a directly from all sides so that no section of the surface of this filter tube is cut off from the heat radiating from the wall of the housing by another filter tube, in other words no section of the filter tube lies in the shadow of another tube.

The same relationships of course also apply to all the other filter tubes.

In order that those sections of the walls of the filter tubes 7 which lie on the inside of the circular arc will also be exposed directly to radiant heat, it may in some cases be advisable to provide a radiant heater 13 such as a heating tube or bar at the centre of the arc. The heating tube may, for example, be connected to the double jacket 9 so that the same heating medium flows through it as through the double jacket, or alternatively the radiant heater 13 may be supplied with heat from a separate source.

If the vapour leaving the container 1 reaches the filter tubes 7 from outside and flows as purified vapour through the interior of the filter tubes, it is suitable to arrange a radiant heater 14 in the form of a heating bar or tube in the interior of each filter tube 7. In that case, it is necessary to provide the housing 4 with a double jacket and arrange a radiant heater 13 at the centre.

In all these cases, the wall of the filter tubes 7 will always be at a sufficiently high temperature to ensure that the fluid material which is to be filtered will not condense in the region of the filter.

We claim:

1. A vacuum filter for separating solid particles from gaseous materials which comprise condensable substances, comprising a walled housing, insulating means around said housing and spaced therefrom to define a space therebetween, a heating medium circulated through said space for radiantly heating the interior of said housing, a plurality of filter tubes mounted in spaced relation in said housing, gas inlet means communicating with the interior of said filter tubes for directing said gaseous material into said tubes and outwardly through the walls of said filter tubes, outlet means for removing the filtered gas from said housing, said filter tubes being spaced from the wall of said housing by a distance equal to at least half the diameter of said tubes and being spaced from each other in a generally circular pattern in said housing and situated sufficiently far apart from each other so that said radiant heat will impinge directly on all surfaces of each of said filter tubes, countercurrently to the direction of said gaseous materials passing outwardly from said filter tubes.

2. The vacuum filter according to claim 1, wherein said insulating means comprises said double jacket through which a heating medium flows.

3. A vacuum filter for separating solid particles from gaseous materials which comprise condensable substances, comprising a housing, a double jacket radiant heater surrounding said housing for heating and insulating the same, a plurality of filter tubes mounted in spaced relation in said housing, said filter tubes being spaced from the wall of said housing by a distance equal to at least half their diameter and being arranged generally in a circle, gas inlet means for directing said gaseous material into said housing exteriorly of said filter tubes and thereafter flowing into the interior of said filter tubes, means for removing the filtered gas from said housing, a radiant heater positioned substantially in the center of said housing and spaced from said filter tubes, and radiant heating means positioned in the interior of each filter tube whereby the radiant heating means provides radiant heat directed radially outwardly of the filter tubes countercurrently to the flow of said gaseous materials inwardly of the tubes.

* * * * *